United States Patent [19]
Dupuis et al.

[11] Patent Number: 5,494,473
[45] Date of Patent: Feb. 27, 1996

[54] ELECTRICAL ACCESS FOR ELECTRICAL LAPPING GUIDES

[75] Inventors: David J. Dupuis, Westminster; David J. Kindler, Concord; Alan B. Smith, Lincoln, all of Mass.

[73] Assignee: Quantum Corporation, Milpitas, Calif.

[21] Appl. No.: 89,141

[22] Filed: Jul. 7, 1993

[51] Int. Cl.$^6$ .............................. B24B 49/00; B24B 51/00
[52] U.S. Cl. ........................... 451/1; 451/28; 29/603.09
[58] Field of Search ................................ 451/5, 9, 10, 11, 451/28, 41, 1; 29/603

[56] References Cited

U.S. PATENT DOCUMENTS

| | | | |
|---|---|---|---|
| 3,821,815 | 6/1974 | Abbott et al. | 51/281 R |
| 4,559,743 | 12/1985 | Kracke et al. | 51/165 R |
| 4,675,986 | 6/1987 | Yen | 29/603 |
| 4,689,877 | 9/1987 | Church | 29/603 |
| 5,023,991 | 6/1991 | Smith | 51/165 R |
| 5,095,613 | 3/1992 | Hussinger et al. | 26/603 |
| 5,175,938 | 1/1993 | Smith | 51/165 R |

*Primary Examiner*—Bruce M. Kisliuk
*Assistant Examiner*—Eileen P. Morgan
*Attorney, Agent, or Firm*—David B. Harrison; John C. Chen

[57] ABSTRACT

The invention provides a new method and apparatus for electrically accessing a lapping sensor positioned along a row of slider sites on a wafer. The apparatus for accessing the lapping sensor may be positioned outside of the boundaries of the slider sites. The apparatus may also provide top conductors electrically connecting target pads to contact pads. The process for lapping rows of slider sites includes coupling a measurement device to a target pad, coupling a lapping sensor to the top conductor, and lapping the row until the measurement device detects a predetermined signal from the lapping sensor.

2 Claims, 6 Drawing Sheets

ELECTRICAL ACCESS FOR ELECTRICAL LAPPING GUIDES

FIELD OF THE INVENTION

The present invention relates to an apparatus and a method for the provision of electrical access to lapping sensors during a lapping process.

BACKGROUND OF THE INVENTION

Hard disk drives are widely used in computer and other systems to store information. These disk drives have a rigid disk of magnetic material on which binary data is written and stored for later retrieval. Data is written on the disk by moving a magnetic recording head to a position over the disk where the data is to be stored. The magnetic recording head then generates a magnetic field, which encodes the data into the magnetic material of the disk. Data is read from the disk by similarly positioning the magnetic recording head and then sensing the magnetic field of the disk's magnetic material. The positioning of the magnetic recording head is accomplished by continually spinning the disk while positioning a moveable arm over the surface of the disk. The moveable arm carries the magnetic recording head in a sweeping motion, generally across the radius of the disk. Read and write operations are synchronized with the rotation of the disk to insure that the data is read from and written to the desired location on the disk.

The magnetic recording head is generally encapsulated in a disk slider, which provides physical support for both the magnetic recording head and the electrical connections between the magnetic recording head and the remainder of the disk drive system. The disk slider also provides an air-bearing surface which permits the magnetic recording head to "fly" in close proximity to the surface of the spinning disk. Two parameters which are controlled by the design of the disk slider affect the amount of information which may be stored on the disk. One is the distance between the magnetic recording head imbedded in the disk slider and the surface of the disk. As this distance is reduced, the spacial density of binary information encoded on the disk may be increased. Another important slider characteristic is the precise positioning of the magnetic recording head within the body of the disk slider.

Disk sliders, typically formed from a ceramic wafer, generally have one or more parallel rails whose bottom surfaces form air-bearing surfaces capable of flying over the spinning disk. The magnetic recording head is mounted within the disk slider, and extends down through a rail, terminating at the air-bearing surface of the rail. Lapping processes attempt to create a smooth air-bearing surface by removing material from the magnetic recording head and rail surfaces. To form sliders with air-bearing surfaces that are precisely positioned relative to the structure of the magnetic recording head, the lapping process must be tightly controlled.

A technique for controlling the lapping process, described in U.S. Pat. No. 5,023,991, issued on Jun. 18, 1991, involves the use of an electrical lapping guide structure on the disk slider. Such techniques require that electrical contact be made to the electrical lapping guides during the lapping process. Relatively large contact pads are generally provided on the slider to allow this electrical contact to be made. However, as sliders become smaller to accommodate smaller disk drives, the electrical lapping guide contact pads can become a limiting factor because of the space on the slider that they occupy.

Making the electrical connections to the electrical lapping guide structure can also be difficult. This can be a particular problem when the sliders are lapped while still attached to the wafer from which they are formed, as described in U.S. Pat. No. 5,095,613 issued to Hussinger et al. on Mar. 17, 1992. Such a fabrication process may require relatively long connections to be made to the electrical lapping guides, extending across the face of the wafer. In addition to problems caused by the length of the bonds, the bonds must also be removed after the lapping process is completed and the slider is to be removed from the wafer. Removal of the wire bond generally leaves a scar and possibly some residue on the slider at the point of contact, presenting the risk of particulate breaking away from the bonding area at a later time.

The electrical lapping guide structures, beyond requiring contact pads and electrical connections, also occupy space on the disk slider. Thus, the use of existing electrical lapping guides limits the achievable reduction in the size of disk sliders which using these electrical lapping guides.

In light of the foregoing, it is desirable to have an apparatus for controlling the lapping of sliders which requires a minimum of space on the disk slider so as to allow the production of smaller disk sliders. It is desirable that both the electrical lapping guide structure and any associated contact area require a minimum of space on the disk slider. It is further desirable that the apparatus provide for a simple and reliable electrical contacting mechanism between the electrical lapping guide and the lapping device.

SUMMARY OF THE INVENTION

The invention relates to a wafer having a row of sliders sites with means for electrically accessing a lapping sensor, the means for electrically accessing the lapping sensor being located outside of the boundaries of the slider sites. In a narrower sense, the means for electrically accessing is located in a kerf of the wafer, the kerf separating adjacent rows of slider sites.

The invention further relates to a wafer having a target pad and rows of slider sites, the rows having means for sensing lapping depth and means for providing access to the means for sensing. The wafer further comprises a top conductor electrically coupling the target pad to a corresponding contact pad embodied in the means for providing access on each row.

The invention further relates to a process for lapping rows of slider sites on a substrate comprising the coupling of a measurement device to a target pad on the substrate, coupling a lapping sensor in the row to a top conductor electrically connected to the target pad, and lapping the outer row until the lapping sensor indicates the desired lapping depth has been achieved.

DETAILED DESCRIPTION OF THE PREFERRED EMBODIMENT

Figure 1:
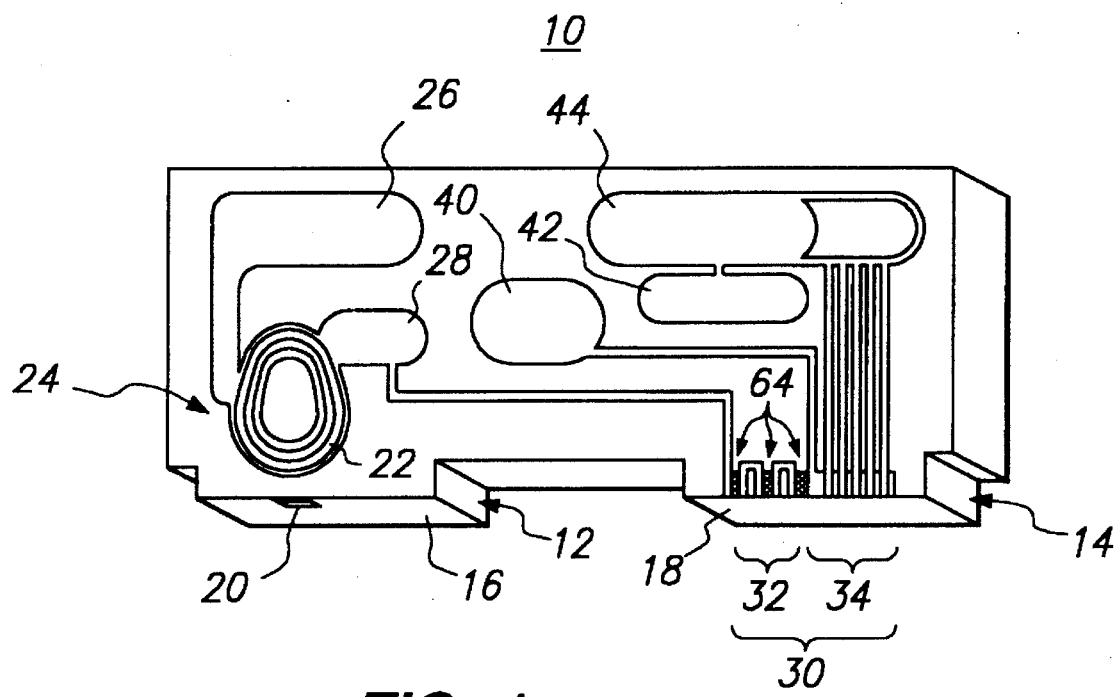
FIG. 1 is an isometric view of a disk slider having an electrical lapping guide imbedded in one rail according to the principles of the invention.

FIG. 1 shows an embodiment of a disk slider 10 according to the principles of the invention. In this embodiment, the slider 10 has two rails 12 and 14 which provide air-bearing surfaces 16 and 18. Embedded in one of the air-bearing surfaces 16 are magnetic poles 20. A magnetic field may be induced in the magnetic poles 20 by conducting an electrical current through a coil 22 positioned above the air-bearing surface 16 of the rail 12. Though shown as a multilayer multiple-turn coil, the coil 22 may also be constructed from a single-layer or a single-turn coil and remain consistent with the principles of the invention. The coil 22 and magnetic poles 20 together form a thin-film magnetic recording head 24. Because it is the rail 12 containing the thin-film magnetic recording head 24 that is to be lapped in a controlled manner, the corresponding air-bearing surface 16 is also referred to as a lap surface.

The coil 22 also has two recording head bonding pads 26 and 28. Each recording head bonding pad 26 and 28 is connected to an end of the electrically conductive path provided by the coil 22. Upon assembly of the slider 10 to a head/disk assembly (not shown,) electrical contact to the thin-film magnetic recording head 24 is made through the recording head bonding pads 26 and 28.

The embodiment of FIG. 1 also includes a lapping sensor imbedded in the rail 14 which does not carry the thin-film recording head 24. In the embodiment shown, the sensor is an electrical lapping guide 30. The air-bearing surface 18 of the rail 14 containing the electrical lapping guide 30 is also referred to as a sensor surface. As shown, the electrical lapping guide 30 comprises two portions, a resistive portion 32 and a breakpoint portion 34. Electrical contact to the electrical lapping guide 30 is made via test points identified by numerals 40, 42, and 44, and by recording head bonding pads 26 and 28. The recording head bonding pads 26 and 28 are used as test points to save space and materials. However, discrete test points may be used in their place.

Figure 2:
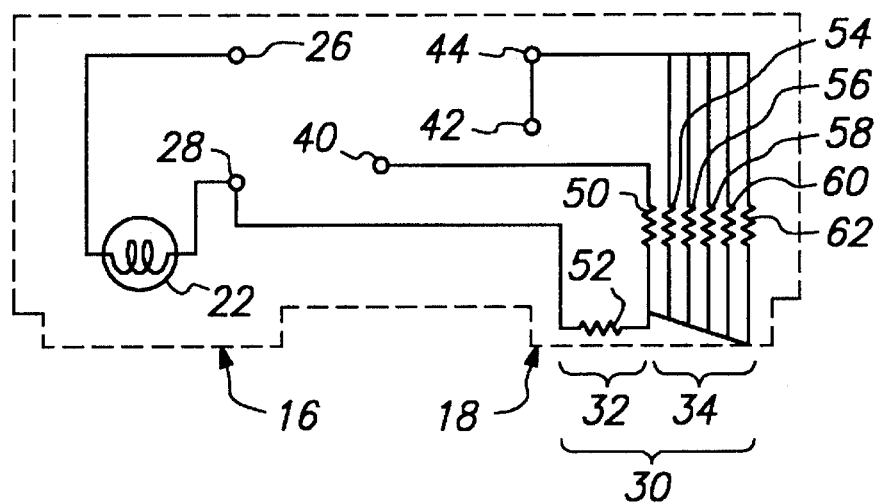
FIG. 2 is a schematic diagram of the electrical lapping guide of the disk slider of FIG. 1.

FIG. 2 represents a schematic diagram of the electrical lapping guide 30 shown on the disk slider 10 of FIG. 1. The junction of the resistive and breakpoint portions 32 and 34 is connected by a lead to test point 40. The resistance of this lead is represented by resistor 50. Resistor 52 represents the resistive portion 32 of the electrical lapping guide 30, and is embodied as a series of three resistive portions 64 (shown in FIG. 1) which abut the air-bearing surface 18. Resistors 54 through 62 are arranged in parallel between test point 44 and resistor 50 of test point 40. The junction of resistors 50, 54, 56, 58, 60, and 62 is shown as a conductive path skewed from, but intersecting, the plane defined by the air-bearing surface 18.

As the disk slider 10 is lapped, material is removed from the air-bearing surface 16 and 18 of each rail 12 and 14. The tip of the magnetic poles 20 are precisely positioned relative to the coil 22 by lapping the rails 12 and 14 to a predetermined level. The lapping process is halted when this level is achieved. It is the changing electrical properties of the resistive and breakpoint portions 32 and 34 of the electrical lapping guide 30 that allow the lapping process to be monitored, and ultimately halted at the correct moment.

As material is lapped off of the rails 12 and 14, resistive material 64 from resistor 52 is gradually eroded. This erosion effectively increases the resistance of resistor 52, providing an electrically measurable characteristic which reflects the progress of the lapping process. Similarly, as material is lapped off of the rails 12 and 14, the conductive path joining resistors 50 through 62 is gradually eroded. As this path is eroded, resistor 62 is the first resistor to be broken from the path, followed by resistors 60, 58, 56, and 54 in sequence, if the rails 12 and 14 continue to be lapped. As each of these parallel resistors is broken from the conductive path, the resistance between test points 40 and 44 is increased. This step-wise change in resistance provides an additional measure of the progress being made by the lapping process.

Figure 3:
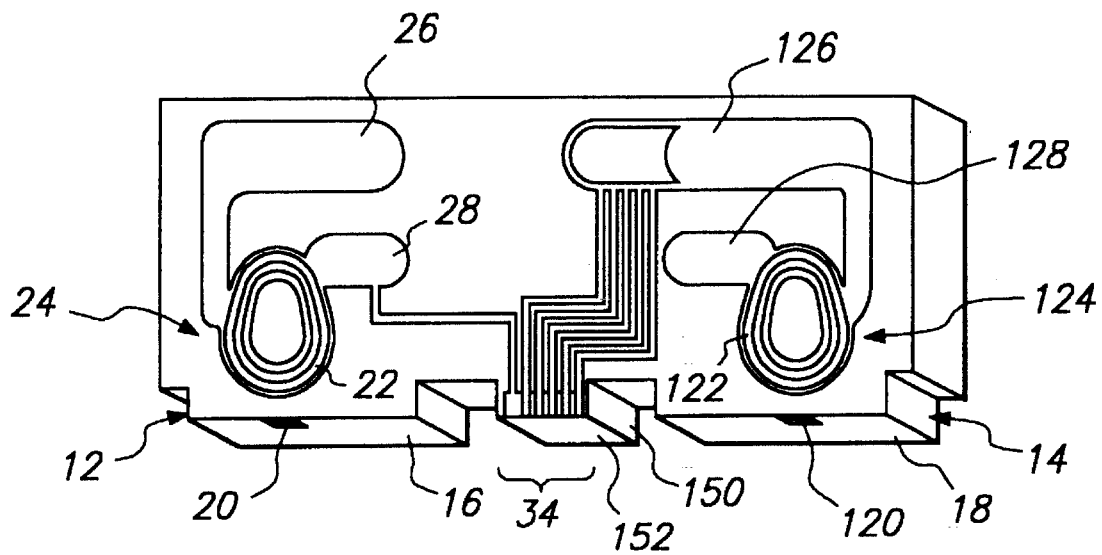
FIG. 3 is an isometric view of a disk slider incorporating only the breakpoint portion of an electrical lapping guide.

FIG. 3 illustrates an embodiment of a disk slider 100 which is based on a conventional two-rail structure having redundant thin-film magnetic recording heads. As shown, the disk slider 100 has two rails 12 and 14, each with a thin-film magnetic recording head 24 and 124 and with a lapping, or air-bearing, surface 16 and 18. As in FIG. 1, the thin-film magnetic recording heads 24 and 124 comprise coils 22 and 122, poles 20 and 120, and recording head bonding pads 26, 28, 126, and 128. The disk slider 100 also has a sensor rail 150 which has a sensor surface 152 and carries the breakpoint portion 34 of an electrical lapping guide, which has the same electrical representation as the breakpoint portion 34 shown in FIG. 2. This remains a two-rail disk slider, however, as the sensor rail 150 is removed by a machining process after the disk slider 100 has been lapped. During lapping of the disk slider 100, the sensor surface 152 of the sensor rail 150 is lapped in parallel with the two air-bearing surfaces 16 and 18. Thus, the parallel resistances embodied in the breakpoint portion 34 of the electrical lapping guide provide the same step-wise change in resistance in response to the lapping progress as described in conjunction with FIGS. 1 and 2.

The sensor rail 150 of the disk slider 100 of FIG. 3 carries only the breakpoint portion 34 of the electrical lapping guide, and not the resistive portion. This allows the sensor rail 150, and thus the disk slider 100 as a whole, to be physically smaller than that of a similar disk slider which carries both portions 32 and 34 of an electrical lapping guide 30 on a sensor rail. Because the structure of the electrical lapping guide 30 is "on board" the disk slider 100, no extra space between disk sliders is occupied. Thus, the number of disk sliders which may be fabricated from a given wafer is maximized. Increasing the number of disk sliders per wafer leads to a reduced cost of production per disk slider.

Figure 4:
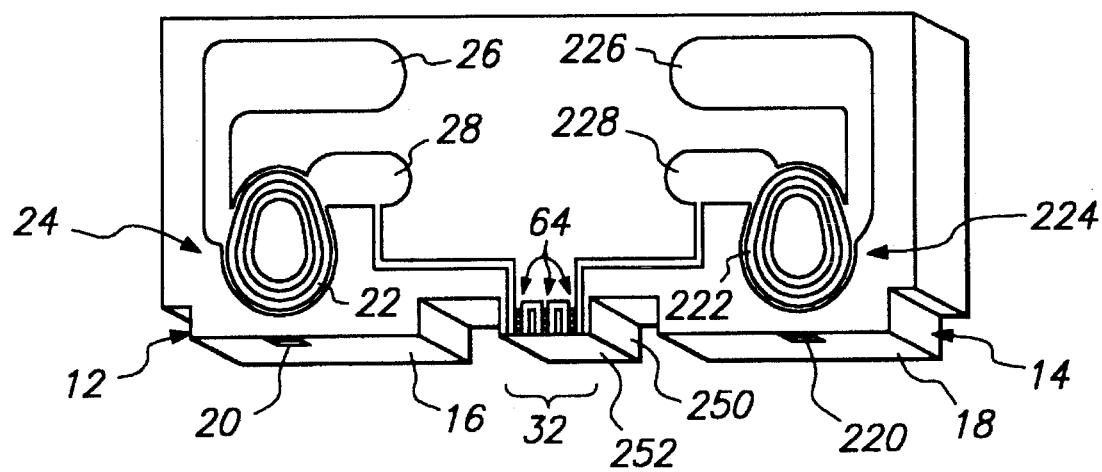
FIG. 4 is an isometric view of a disk slider incorporating only the resistive portion of an electrical lapping guide.

FIG. 4 illustrates an alternative embodiment of a disk slider 200 which is based on a conventional two-rail structure having redundant thin-film magnetic recording heads. As shown, the disk slider 200 has two rails 12 and 14, each with a thin-film magnetic recording head 24 and 224 respectively. Again, the thin-film magnetic recording heads 24 and 224 comprise coils 22 and 222, poles 20 and 220, and recording head bonding pads 26, 28, 226, and 228. The disk slider 200 also has a sensor rail 250 which carries the resistive portion 32 of an electrical lapping guide. This resistive portion 32 has the same electrical representation as the resistive portion 32 shown in FIG. 2. As for the disk slider 200 of FIG. 4, the sensor rail 250 of the disk slider 200 is removed by a machining process after the disk slider 200 has been lapped. During lapping of the disk slider 200, the surface 252 of the sensor rail 250 is lapped in parallel with the two air-bearing surfaces 16 and 18, gradually eroding the resistive material 64. Therefore, the resistance across the resistive portion 32 increases as the lapping process removes material from the surfaces 16, 18, and 252 of each rail 12 and 14 and sensor rail 250 respectively, as described in conjunction with FIGS. 1 and 2.

As in FIG. 3, the sensor rail 250 of the disk slider 200 of FIG. 4 carries only one portion of an electrical lapping guide. This allows the sensor rail 250, and thus the disk slider 200 as a whole, to be physically smaller than a similar disk slider which carries both portions 32 and 34 of an electrical lapping guide 30 on a sensor rail.

Figure 5:
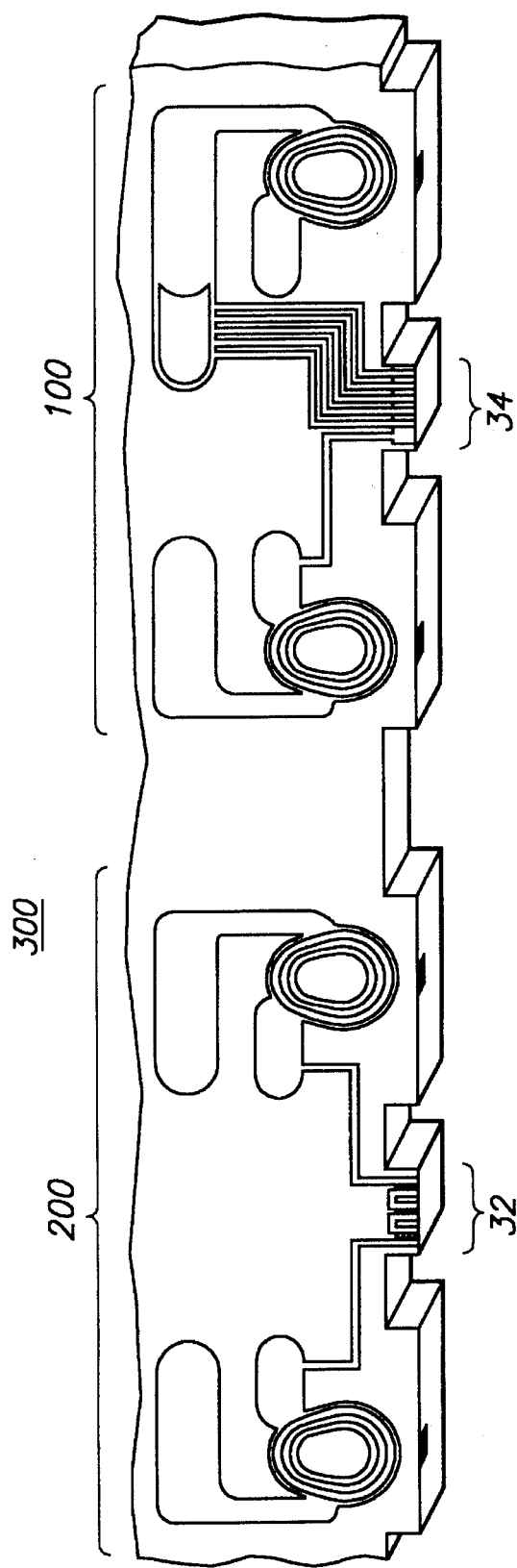
FIG. 5 is an isometric view of a portion of a row of disk sliders which includes the disk sliders of FIGS. 3 and 4.

FIG. 5 shows the disk sliders 100 and 200 of FIGS. 3 and 4 during a fabrication process. In this process, multiple disk sliders are lapped simultaneously while still attached in a row 300 to the wafer from which they are formed. After the lapping process is complete, the individual disk sliders 100 and 200 are cut from the wafer by a machining process. Disk sliders 100 and 200 are well suited to such a row-based process because the disk sliders may be reduced in size while still providing the lapping process with the benefit of both the resistive 32 and the breakpoint 34 portions of an electrical lapping guide.

In the embodiment shown, an adjacent pair of disk sliders 100 and 200, one containing the resistive portion 32 and the other containing the breakpoint portion 34 of the electrical lapping guide, is located approximately one third of the way in from one end of the row 300 of disk sliders being lapped. A similar pair of adjacent disk sliders is located approximately one third of the way in from the other end of the row 300 of disk sliders. Spacing the electrical lapping guides apart in this or in a similar manner allows the detection of non-uniform lapping depths to be monitored across the length of the row 300. In addition, more electrical lapping guides may be incorporated into the row 300 by including resistive or breakpoint portions 32 and 34 in more, or in all, of the disk sliders in the row 300.

Electrical contact to the test points and to the recording head bonding pads of FIGS. 1 through 5 may be made by holding electrical probes in contact with the disk slider during lapping, or by attaching electrical conductors to the disk slider. In a preferred embodiment, wire bonds are made to the test points and to the recording head bonding pads as required to make electrical contact with the electrical lapping guides. Upon the completion of lapping process, the wire bonds are stripped off of the disk slider. When the disk sliders are processed in rows, as shown in FIG. 5, the wire bonds may extend from the disk slider to a contact area on the wafer. The contact area is located away from the wafer surface being lapped so that the contact area is not affected by the lapping process or by the removal of successive rows of sliders. The contact area may be electrically coupled to equipment for monitoring the electrical lapping guides via electrical conductors, such as by a flex circuit.

In FIG. 5, the row of disk sliders are lapped simultaneously while still attached to the wafer from which they are formed. Alternatively, the row of disk sliders may be kept intact, but be separated from the wafer. This may be done, for instance, by cutting the row of disk sliders from the wafer with a diamond grinding wheel while leaving the disk sliders 100 and 200 attached to each other and to other disk sliders in the row. The disk sliders in the row may then be lapped simultaneously and processed, as described above in reference to FIG. 5.

Figure 6:
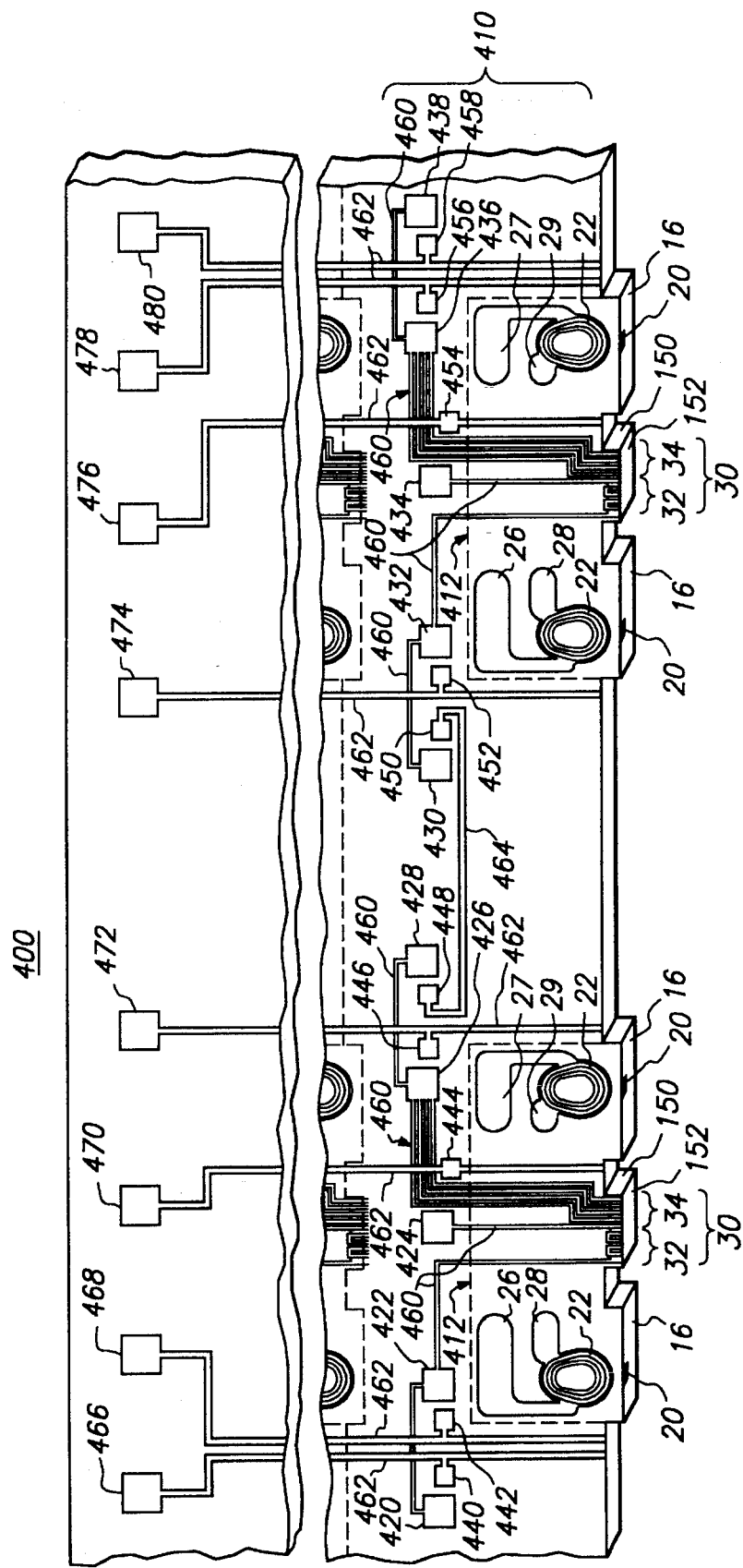
FIG. 6 is an isometric view of a segment of a wafer which provides electrical access to electrical lapping guides on a row of disk sliders.

FIG. 6 shows a segment of a wafer 400 containing multiple rows 410 of partially fabricated disk sliders 412. Slider sites, outlined by dashed lines and including the sensor rail 150, indicate the location of the disk sliders 412 being fabricated. The principles of the invention allow the disk sliders 412 fabricated from this wafer 400 to be physically smaller than similar conventional disk sliders which use electrical lapping guides 30. The size reduction is achieved by locating all of the electrical access features of the electrical lapping guides 30 on the "kerf" and on the unused space between the sliders 412. The kerf is the portion of the wafer 400 which separates successive rows 410 of sliders 412. The kerf material is removed when a row 410 of sliders 412 is cut, such as by a diamond grinding wheel, from the remainder of the wafer 400.

As in FIGS. 1 through 5, electrical access must be provided to the electrical lapping guides 30 of FIG. 6 during the lapping process to monitor the position of the air-bearing surfaces 16. The wafer 400 and disk sliders 412 of FIG. 6 provide an alternative technique for achieving this access.

In FIG. 6, five access pads 420 to 428 and 430 to 438 are provided for each electrical lapping guide 30. These are connected to the electrical lapping guide 30 by electrical lapping guide conductors 460. The five access pads 420 to 428 and 430 to 438 allow sensitive four-wire resistive measurements to be made of each portion 32 and 34 of the electrical lapping guides 30. For each access pad 420 to 438, there is a corresponding contact pad 440 to 458. As shown in FIG. 6, each contact pad 440 to 458 is positioned in a region adjacent to the corresponding access pad 420 to 438. Top conductors 462 are provided which electrically connect contact pads 440 to 458 to terminal pads 466 to 480, and a cross conductor 464 electrically connects contact pads 448 and 450. As shown, the top conductors 462 and cross conductor 464 are electrically connected to the contact pads 440 to 458, but are electrically isolated from the electrical lapping guide conductors 460 and pads 420 to 438. In FIG. 6, this is achieved by using gold top conductors 462 and gold cross conductors 464, with each being layered on top of an insulating encapsulation layer. Alternatively, the top conductors 462 and the cross conductor 464 may be applied to the wafer 400 first, with the electrical lapping guide conductors 460 applied later, similarly layered on top of an insulating encapsulation layer.

Electrical access is provided to the electrical lapping guides 30 by electrically connecting the access pads 420 to 438 to the contact pads 440 to 458. This may be done by applying a bead, or layer, of conductive material between each pair of access pads 420 to 438 and contact pads 440 to 458, with an insulation layer separating the bead from any intervening and exposed electrical lapping guide conductors 460. The electrical connection may also be made by a wire bonding process. As shown in FIG. 6, access pad 420 is to be connected to contact pad 440, pad 422 connected to pad 442, pad 424 connected to pad 444, and so on, through the connection of access pad 438 to contact pad 458. Once connected, an electrical path is completed from access pads 420, 422, 424, 426, 432, 434, 436, and 438 to the corresponding contact pads 440, 442, 444, 446, 452, 454, 546, and 458, through a top conductor 462, to terminal pads 466 to 480. Access pads 428 and 430 are connected together by contact pads 448 and 450 via cross conductor 464. Contact pads 448 and 450 do not connect to terminal pads because they are not required to do so to provide four-wire measurements of each electrical lapping guide 30. Instead, terminal pads 466 to 474 may be used for one electrical lapping guide 30, and terminal pads 472 to 480 for the other. Instead of sharing terminal pads 472 and 474 in this manner, top conductors could instead be provided to connect contact pads 448 and 450 to additional terminal pads.

In the embodiment of FIG. 6, the recording head bonding pads 26 through 29 are approximately 0.004 by 0.006 inches in size. The access pads and the contact pads may be 0.009 inches square or larger, to facilitate quick and simple wire bonding. The kerf width, the distance between the top of the disk sliders in one row and the air-bearing surfaces of the disk sliders in the next row, is approximately 0.010 to 0.012 inches. Disk sliders along a row are separated in FIG. 6 by approximately 0.010 inches, with each finished disk slider 412 being approximately 0.017 inches high (in the direction of the top conductors 462) and 0.063 inches wide (in the direction of the cross conductor 464.)

The embodiment of FIG. 6 illustrates adjacent disk sliders 412 having electrical lapping guides 30. Alternatively, any number of disk sliders may be positioned, along the row 410 of the wafer 400, between the disk sliders 412 shown. As can be seen from FIG. 6, intervening disk sliders not containing electrical lapping guides 30 will not interfere with any of the conductors or pads on the wafer 400.

Figure 7:
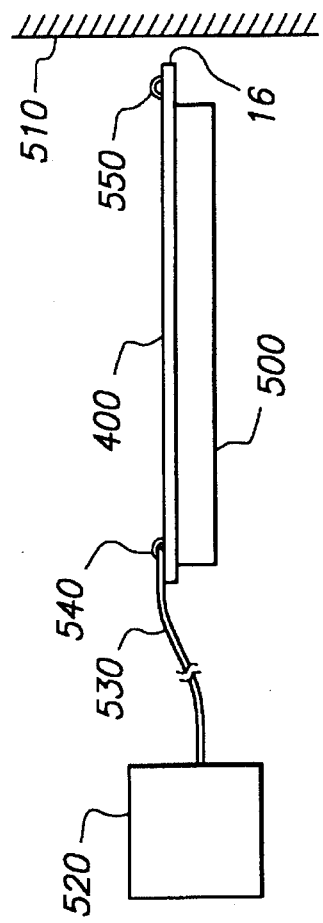
FIG. 7 is a elevation view of the wafer of FIG. 6 mounted to a base and connected to a measurement device for monitoring the lapping of the wafer by a lapping surface.

FIG. 7 shows a side view of the wafer 400 of FIG. 6 prepared for lapping. The wafer 400 is mounted on a base 500 and positioned such that the air-bearing surfaces 16 of the sliders may be forced against a lapping surface 510. A measurement device 520 is used to monitor the electrical characteristics of the electrical lapping guides 30 during the lapping process. As shown, the measurement device 520 is electrically connected to the terminal pads 466 to 480 by a flex circuit 530. The flex circuit 530 may be attached to the wafer 400 by an adhesive, by spring clips, or by other suitable means. Where the flex circuit 530 is inserted into a connector, or the like, and where the connector is mounted on the wafer, the connector may in turn be in electrical contact with the terminal pads 466 to 480. Alternatively, the flex circuit 530 may be mechanically attached or adhered to the wafer 400, and then wire bonded or otherwise electrically connected to the terminal pads 466 to 480. FIG. 7 shows the flex circuit 530 attached to the wafer 400 by adhesive and coupled to the terminal pads 466 to 480 by wire bonds 540. Wire bonds 550 are also shown between the access pads 420 to 438 and the contact pads 440 to 458.

Figure 8:
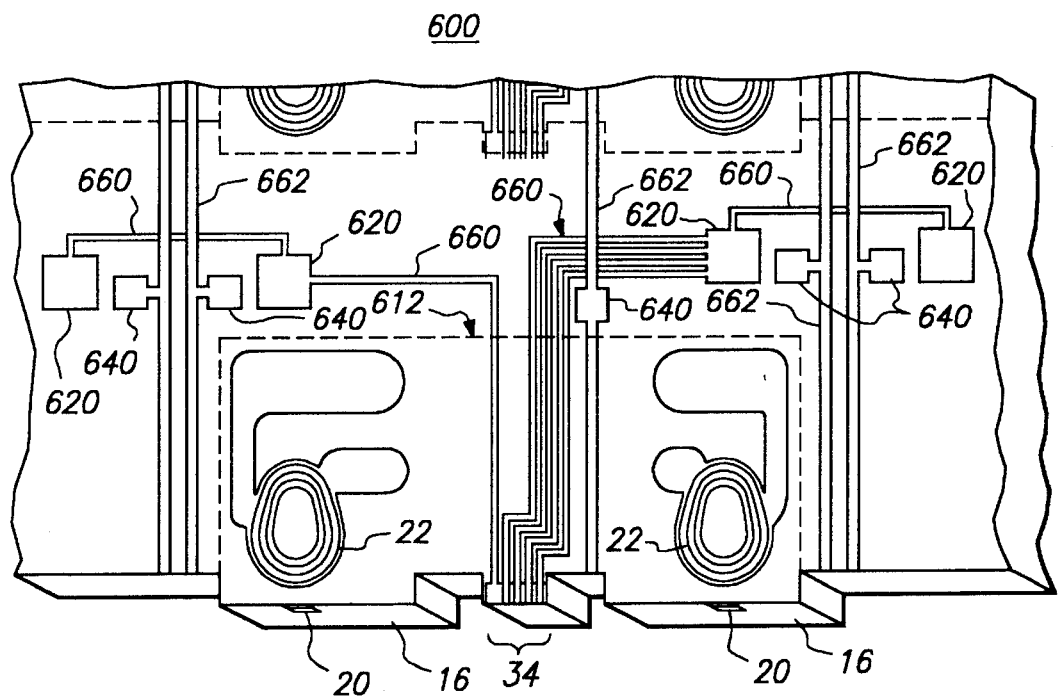
FIG. 8 is an isometric view of a segment of a wafer providing electrical access to the breakpoint portion of an electrical lapping guide on a disk slider.
Figure 9:
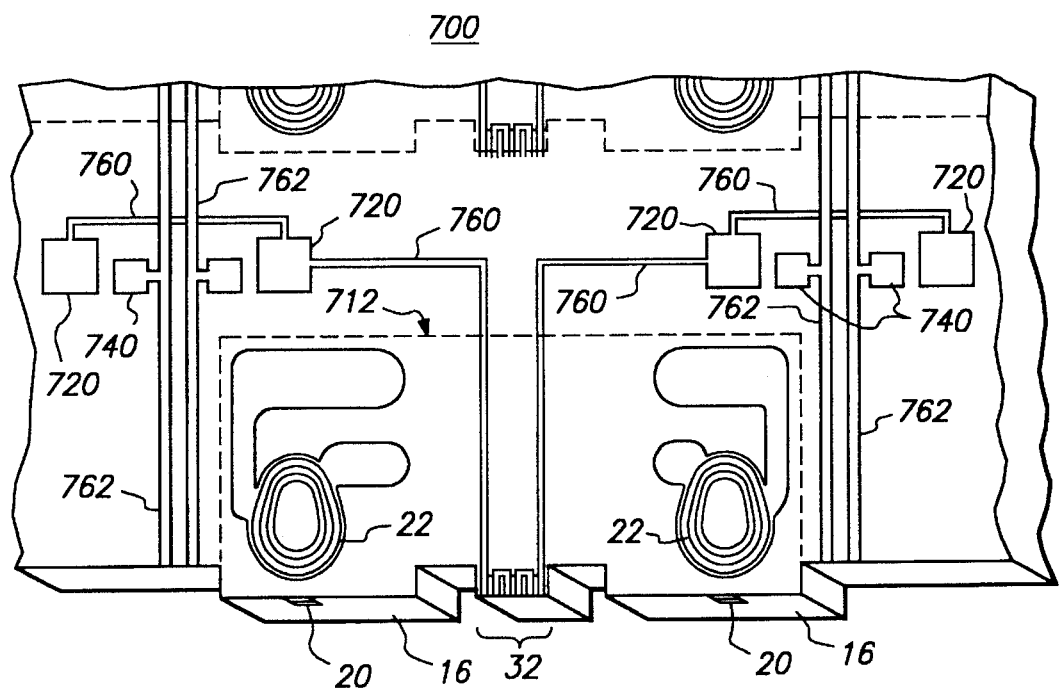
FIG. 9 is an isometric view of a segment of a wafer providing electrical access to the resistive portion of an electrical lapping guide.

FIGS. 8 and 9 show additional embodiments according to the principles of the invention. The wafer 600 embodied in FIG. 8 combines the electrical access features of the wafer 400 of FIGS. 6 and 7 with the break point portion 34 of the electrical lapping guide 30 configuration of FIG. 3. Included is a disk slider 612 with coils 22, magnetic poles 20, and air-bearing surfaces 16. The break point portion 34 of an electrical lapping guide is connected to access pads 620 via electrical lapping guide conductors 660. Contact pads 640 are, in turn, connected to top conductors 662.

The wafer 700 embodied in FIG. 9 combines the electrical access features of the wafer 400 of FIGS. 6 and 7 with the resistive portion 32 of the electrical lapping guide 30 configuration of FIG. 4. As in FIG. 8, the wafer 700 of FIG. 9 includes a disk slider 712 with coils 22, magnetic poles 20, and air-bearing surfaces 16. The break point portion 34 of an electrical lapping guide is connected to access pads 720 via electrical lapping guide conductors 760. Contact pads 740 are, in turn, connected to top conductors 762.

Figure 10:
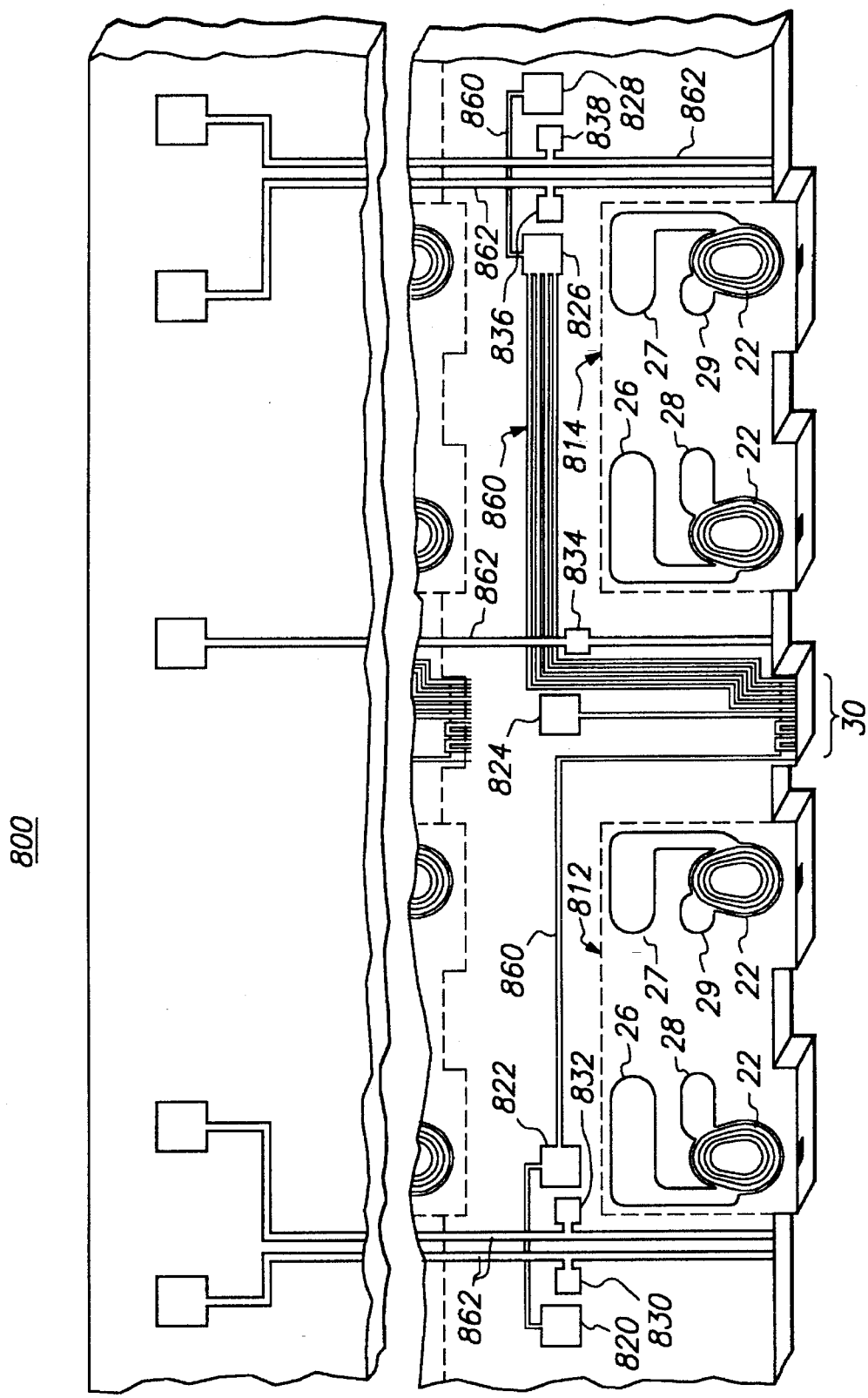
FIG. 10 is an isometric view of a segment of a wafer which provides electrical access to electrical lapping guides which are positioned in between adjacent disk sliders.

FIG. 10 shows a wafer 800 having analogous electrical access features as the wafer 400 of FIG. 6. In FIG. 10, however, the electrical lapping guide 30 is located between two adjacent disk sliders 812 and 814. The configuration of FIG. 10 has the advantage of entirely decoupling the disk sliders 812 and 814 from the electrical lapping guide 30 and any provisions for electrical access to the electrical lapping guide 30. Thus, the disk sliders 812 and 814 may be dramatically reduced in size without compromising the size or the use of electrical lapping guides 30. For example, this allows the disk sliders 812 and 814 to be fabricated, using electrical lapping guides 30, where neither the contact pads 830 to 838 nor the access pads 820 to 828 would fit on the disk sliders 812 and 814. Simply reducing the scale of the contact pads 830 to 838 and of the access pads 820 to 828 is not generally desirable, particularly where a bonding process is used to attach to the electrical lapping guides 30.

The configuration of FIG. 10 offers the further benefit of increased corrosion resistance. Once fabricated, the disk sliders 412 of FIG. 6 include electrical lapping guide conductors 460 and top conductors 462 that are cut off at the edges of the disk sliders 412. It is possible, though not common, for the exposed conductive material of these conductors to corrode. This corrosion may work its way along the conductors and cause delamination of the disk slider 412. In FIG. 6, this possibility may be prevented by encapsulating the truncated ends of the conductors 460 and 462. The disk sliders 812 and 814 of FIG. 10, however, includes neither electrical lapping guide conductors 860 nor top conductors 862. Thus, the conductors 860 and 862 are not terminated at the edge of the disk sliders 812 and 814 and do not present an opportunity for possible corrosion or delamination.

In addition, the configuration of FIG. 10 may simplify the fabrication process by eliminating the need to remove from any disk sliders a rail dedicated to carrying an electrical lapping guide. Instead, after the lapping process is complete, the disk sliders 812 and 814 can immediately be cut away from the wafer 800, without having to return the wafer to an intervening grinding operation.

Consistent with the descriptions in conjunction with the other figures, the wafer of FIG. 10 may be embodied so as to provide for two electrical lapping guides 30 per row of disk sliders. In such an embodiment, each electrical lapping guide 30 may be located approximately one third of the way from each end of the row. The placement of the two electrical lapping guides 30 along a row may be selected by applying a best fit line to an estimate of the contour formed by the row of disk sliders. Where the contour is a parabola, due to warping of the row or other fabrication errors, the electrical lapping guides 30 may be located at the two points of intersection between the best fit line and the parabola. This placement minimizes any lapping error caused by warping of the row of disk sliders. In the embodiment shown, the intersection points are approximately one third of the way from each end of the row. To better detect such errors, many more electrical lapping guides 30 may be used per row. Alternatively, a single electrical lapping guide 30 may be used per row where the lapping process can insure substantially uniform lapping across the row.

Also consistent with the principles of the invention is an embodiment of a wafer which combines the electrical access features of the wafer 800 of FIG. 10 with the electrical lapping guide configurations of the disk sliders 100 and 200 FIGS. 3 and 4, respectively. Such a wafer provides the resistive portion 32 of an electrical lapping guide 30 between one pair of adjacent disk sliders, and the break point portion 34 between another pair of adjacent disk sliders. This configuration reduces the width required between the adjacent disk sliders while still isolating the disk sliders from any top conductors or electrical lapping guide conductors.

While specific embodiments of the invention have been shown and described in detail to illustrate the application of the invention principles, it will be apparent that the invention may be embodied otherwise without deviating from the invention set forth in the following claims. For convenience, the figures illustrate the principles of the invention as they are applied to two-rail disk sliders. However, the principles are equally applicable to single-rail disk sliders, wherein the single rail includes an electrical lapping guide, or portion therefore, and to disk sliders having three or more rails.

In addition, the principles of the invention apply not only to the electrical lapping guides described herein, but also to any lapping sensor incorporated into a wafer so long as the lapping sensor has properties which vary predictably with the progress of the lapping process. For example, such lapping sensors may have optical, magnetic, capacitive, or inductive properties which vary predictably in response to lapping depth. Further, the principles of the invention are not limited to the field of disk sliders for magnetic recording. The principles are equally applicable to the fabrication of other components. In this regard, sliders may include any component having a lapped surface which is fabricated from a larger block of material. For example, such sliders may include optical disk heads fabricated in rows from a wafer, or other mechanical components which require the precise formation of a lapped surface.

What is claimed is:

1. A process for lapping rows of slider sites on a substrate comprising the steps of:

A. providing a substrate having a plurality of terminal pads, a top conductor and rows of slider sites, the outer row being the row farthest from the terminal pads, each row having a lapping sensor, the top conductor extending from the terminal pads to a region in each row, the region in each row being adjacent to the lapping sensor in the row;

B. electrically coupling a measurement device to the terminal pads;

C. electrically coupling the lapping sensor in the outer row to the top conductor effective to electronically couple the measurement device to the lapping sensor in the outer row;

D. initiating the lapping of the outer row;

E. monitoring the lapping sensor in the outer row with the measurement device; and F. halting the lapping of the outer row when the measurement device detects a predetermined signal from the lapping sensor in the outer row G. removing the outer row from the substrate and, if the removed row was not the last on the substrate, exposing a new outer row;

H. repeating steps C through G until each row has been lapped and removed from the substrate.

2. The process of claim 1 wherein step G comprises removing the outer row from the substrate with a grinding wheel effective to remove the electrical coupling of step C.

* * * * *